US011879857B2

(12) United States Patent
Sato

(10) Patent No.: US 11,879,857 B2
(45) Date of Patent: Jan. 23, 2024

(54) SINGLE-CRYSTAL X-RAY STRUCTURE ANALYSIS SYSTEM

(71) Applicant: Rigaku Corporation, Tokyo (JP)

(72) Inventor: Takashi Sato, Tokyo (JP)

(73) Assignee: Rigaku Corporation, Tokyo (JP)

( * ) Notice: Subject to any disclaimer, the term of this patent is extended or adjusted under 35 U.S.C. 154(b) by 241 days.

(21) Appl. No.: 17/295,856

(22) PCT Filed: Nov. 21, 2019

(86) PCT No.: PCT/JP2019/045687
§ 371 (c)(1),
(2) Date: May 20, 2021

(87) PCT Pub. No.: WO2020/105718
PCT Pub. Date: May 28, 2020

(65) Prior Publication Data
US 2022/0128494 A1  Apr. 28, 2022

(30) Foreign Application Priority Data
Nov. 22, 2018  (JP) .................. 2018-218751

(51) Int. Cl.
*G01N 23/207*  (2018.01)
(52) U.S. Cl.
CPC ... *G01N 23/2076* (2013.01); *G01N 2223/307* (2013.01); *G01N 2223/604* (2013.01)
(58) Field of Classification Search
None
See application file for complete search history.

(56) References Cited

U.S. PATENT DOCUMENTS

| 6,918,698 B2 | 7/2005 | Nordmeyer et al. |
| 7,274,769 B2 | 9/2007 | Nordmeyer et al. |

(Continued)

FOREIGN PATENT DOCUMENTS

| JP | H06-194276 A | 7/1994 |
| JP | H11-304999 A | 11/1999 |

(Continued)

OTHER PUBLICATIONS

EP Search Report issued in EP Application No. 19 886 255.9, European Patent Office, Munich Germany, dated Jul. 8, 2022, 8 pages.

(Continued)

*Primary Examiner* — David P Porta
*Assistant Examiner* — Mamadou Faye
(74) *Attorney, Agent, or Firm* — ASLAN LAW, P.C.

(57) ABSTRACT

A single-crystal X-ray structure analysis system capable of surely and easily performing a precise step of soaking a very small amount of a sample in a framework of a fine crystal-line sponge, is provided. There are provided a soaking apparatus 500 and a single-crystal X-ray structure analysis apparatus, the single-crystal X-ray structure analysis apparatus comprising a sample holder that holds a sample, the sample holder comprising a porous complex crystal capable of soaking the sample in a plurality of fine pores formed therein; a goniometer that rotationally moves, the goniometer to which the sample holder is attached; an X-ray irradiation section that irradiates the X-rays from the X-ray source to the sample held by the sample holder attached to the goniometer; wherein the soaking apparatus 500 soaks the sample in the porous complex crystal of the sample holder.

5 Claims, 11 Drawing Sheets

(56) References Cited

U.S. PATENT DOCUMENTS

| | | | |
|---|---|---|---|
| 7,660,389 | B1 | 2/2010 | Becker |
| 7,696,991 | B2 | 4/2010 | Higashi |
| 10,190,952 | B2 | 1/2019 | Fujita et al. |
| 10,684,198 | B2 | 6/2020 | Fujita et al. |
| 2003/0068829 | A1* | 4/2003 | Giaquinta ............ G01N 23/20 436/173 |
| 2003/0152194 | A1 | 8/2003 | Nordmeyer et al. |
| 2005/0163280 | A1 | 7/2005 | Nordmeyer et al. |
| 2007/0005268 | A1 | 1/2007 | Higashi |
| 2007/0228049 | A1 | 10/2007 | Nordmeyer et al. |
| 2015/0219533 | A1* | 8/2015 | Fujita ................... C30B 29/58 428/221 |
| 2017/0160212 | A1* | 6/2017 | Kleine .................. G01T 7/005 |
| 2017/0219500 | A1 | 8/2017 | Fujita et al. |
| 2019/0137367 | A1 | 5/2019 | Fujita et al. |
| 2020/0096461 | A1 | 3/2020 | Fujita et al. |

FOREIGN PATENT DOCUMENTS

| | | |
|---|---|---|
| JP | 2003-083412 A | 3/2003 |
| JP | 2007-003394 A | 1/2007 |
| JP | 2013-156218 A | 8/2013 |
| JP | WO 2014/038220 A1 | 3/2014 |
| JP | 2014-130063 A | 7/2014 |
| JP | WO 2016/017770 A1 | 7/2017 |
| JP | 2018-155680 A | 10/2018 |
| WO | WO 2011/115223 A1 | 9/2011 |
| WO | WO 2015/132909 A1 | 9/2015 |
| WO | WO 2018/159692 A1 | 9/2018 |

OTHER PUBLICATIONS

Japanese Patent Office, JP Office Action issued in JP Patent Application No. 2020-557642, Japan, dated Jan. 10, 2023, 4 pages.

Yasuhide Inokuma, Makoto Fujita et al; "X-ray analysis on the nanogram to microgram scale using porous complexes"; Nature 495, 461-466; Mar. 28, 2013.

Hoshino et al., "The crystalline sponge method updated", IUCrJ, (2016), 3, 139-151.

猪熊泰英、常識を覆す結晶構造解析「結晶スポンジ」法, 化学 Yasuhide Inokuma, "'Crystal sponge' method overturns common sense of crystal structure analysis", Chemistry, vol. 68, No. 8, pp. 35-40, in particular, p. 39, fig.5, non-officieal translataion, Aug. 1, 2013.

猪熊泰英、「結晶スポンジ法による極小量化合物のX線結晶構造解析」 Inokuma, Yasuhide et al, "X-ray crystallography of extremely small amount of compounds by crystal sponge method", Farumashia, 2014, vol. 50, No. 8, pp. 756-761, column "5. Application of crystal sponge method", fig. 4, non-official translation.

U.S. Office Action issued in U.S. Appl. No. 17/295,854.

International Search Report issued in PCT Application No. PCT/JP2019/045685.

EP Search Report issued in EP Application No. 19 887 578.3, 8 pages.

JP Office Action issued in JP patent application No. 2020-557640.

U.S. Office Action issued in U.S. Appl. No. 17/295,857, dated Mar. 14, 2023, USPTO, USA, 17 pages.

International Search Report issued in PCT Application No. PCT/JP2019/045689, dated Jan. 7, 2020, JPO, Japan, 3 pages.

EP Search Report issued in EP Application No. 19 886 782.2, dated Sep. 8, 2022, EPO, Germany, 8 pages.

JP Office Action issued in JP Application No. 2020-557644, dated Oct. 18, 2022, JPO, Japan, 4 pages.

U.S. Notice of Allowance issued in U.S. Appl. No. 17/295,855, dated Jun. 13, 2023, USPTO, U.S.A., 38 pages.

U.S. Notice of Allowance issued in U.S. Appl. No. 17/295,857, dated Jul. 11, 2023, USPTO, U.S.A., 39 pages.

Yasuhide Inokuma, "Crystal sponge' method overturns common sense of crystal structure analysis", Chemistry, vol. 68, No. 8, pp. 35-40, in particular, p. 39, fig.5, non-official translation, Aug. 1, 2013.

Inokuma, Yasuhide et al, "X-ray crystallography of extremely small amount of compounds by crystal sponge method", Farumashia, 2014, vol. 50, No. 8, pp. 756-761, col. "5. Application of crystal sponge method", fig. 4, non-official translation.

U.S. Office Action issued in U.S. Appl. No. 17/295,854, dated Mar. 28, 2023, USPTO, USA, 30 pages.

International Search Report issued in PCT Application No. PCT/JP2019/045685, dated Feb. 18, 2020, JPO, Japan, 3 pages.

EP Search Report issued in EP Application No. 19 887 578.3, 8 pages, dated Sep. 19, 2022, EPO, Germany.

JP Office Action issued in JP patent application No. 2020-557640, dated Jan. 10, 2023, JPO, Japan, 4 pages.

JP Office Action (Decision of Refusal) issued in JP patent application No. 2020-557640, JPO Japan, dated Apr. 18, 2023, 2 pages.

U.S. Office Action issued in U.S. Appl. No. 17/295,855, dated Mar. 13, 2023, USPTO, USA, 16 pages.

International Search Report issued in PCT Application No. PCT/JP2019/045686, dated Feb. 18, 2020, JPO, Japan, 2 pages.

EP Search Report issued in EP Application No. 19 886 916.6, 9 pages, dated Sep. 14, 2022, EPO, Germany, 9 pages.

JP Office Action issued in JP patent application No. 2020-557641, dated Jan. 10, 2023, JPO, Japan, 4 pages.

JP Office Action (Decision of Refusal) issued in JP Application No. 2020-557641, dated Apr. 18, 2023, JPO., Japan, 2 pages.

* cited by examiner

SINGLE-CRYSTAL X-RAY STRUCTURE ANALYSIS SYSTEM

CROSS-REFERENCE TO RELATED APPLICATIONS

This application claims priority to JP Patent Application No. 2018-218751 filed on Nov. 22, 2018, and this application claims priority to and is a 371 of international PCT Application No. PCT/JP2019/045687 filed on Nov. 21, 2019, the entire contents of which are hereby incorporated by reference.

TECHNICAL FIELD

The present invention relates to a next-generation single-crystal X-ray structure analysis system capable of analyzing a structure of a material by an aggregative microstructure such as its atomic or molecular arrangement; and relates specifically to a single-crystal X-ray structure system also including means by which a sample to be analyzed is soaked.

BACKGROUND ART

In research and development for new devices and materials, the materials are ordinarily synthesized and evaluated to determine the next research policy based on the foregoing. In a structure analysis of a material using X-ray diffraction for performing material development in a short period of time, a search method of a material structure centering on the material structure analysis capable of efficiently performing the structure analysis, and an X-ray structure analysis used therein are indispensable for efficiently searching the material structure that realizes the function/physical property of an object material.

However, it has been difficult for those other than X-ray specialists to perform the structure analysis based on the results obtained by the foregoing method. Therefore, an X-ray structure analysis system with which the structure analysis can be performed by anyone who is not even a specialist of X-rays has been demanded. In this regard, as is known from the following Patent Document 1, the single-crystal X-ray structure analysis has gained attention as a method capable of catching a precise and highly accurate three-dimensional structure of molecules.

On the other hand, in this single-crystal X-ray structure analysis, there has been such a large constraint that a single-crystal needs to be prepared by crystallizing a sample. However, as is known from not only the following Non-Patent Documents 1 and 2 but also Patent Document 2, the single-crystal X-ray structure analysis becomes widely applicable for those including a liquid compound that cannot be crystallized, a sample incapable of acquiring a sufficient amount for crystallization, and so forth via development of a material called "crystalline sponge" (for example, a porous complex crystal in which countless pores each having a diameter of 0.5 to 1 nm are formed).

PRIOR ART DOCUMENT

Patent Document

Patent Document 1: Japanese Unexamined Patent Application Publication No. 2007-3394
Patent Document 2: Re-publication of PCT International Publication WO2016/017770

Non-Patent Document

Non-Patent Document 1: Makoto Fujita; X-ray analysis on the nanogram to microgram scale using porous complexes; Nature 495, 461-466; 28 Mar. 2013
Non-Patent Document 2: Hoshino et al. (2016), The updated crystalline sponge method IUCrJ, 3, 139-151

SUMMARY OF THE INVENTION

Problems to be Solved by the Invention

However, in the single-crystal X-ray structure analysis as becoming a conventional technique in which the above-described crystalline sponge is used, it is necessary to quickly and accurately perform a step of soaking a sample of a very small amount of approximately several ng to several μg separated by every kind of devices in a framework of a very small and fragile crystalline sponge having a size of approximately 100 μm, and further a step of accompanying fine and precise operations in which the very small crystalline sponge in which the sample is soaked is taken out; is attached to a tool; and is installed at the X-ray irradiation position inside a single-crystal X-ray structure analysis apparatus. In addition, these fine and precise operations carried out in a short period of time largely affect the measurement result of the sample after being soaked in the crystalline sponge, thereby being very important operations.

Accordingly, the present invention has been achieved in view of problems in the above-described conventional technique, and the objective is, specifically, to enable quickly, surely and easily performing single-crystal X-ray structure analysis without conventionally fine and precise operations for which rapidness is required being accompanied, with a very small and fragile crystalline sponge, even if not having specialized knowledge of X-ray structure analysis, in other words, the object is to provide a high-yield, efficient, very versatile and user-friendly single-crystal X-ray structure analysis system.

Means to Solve the Problems (1) In order to achieve the above-described object, it is a feature that the single-crystal X-ray structure analysis system is a single-crystal X-ray structure analysis system that performs a structure analysis of a material, the system comprising a soaking apparatus, and a single-crystal X-ray structure analysis apparatus, the single-crystal X-ray structure analysis apparatus comprising an X-ray source that generates X-rays; a sample holder that holds a sample, the sample holder comprising a porous complex crystal capable of soaking the sample in a plurality of fine pores formed therein; a goniometer that rotationally moves, the goniometer to which the sample holder is attached; an X-ray irradiation section that irradiates the X-rays from the X-ray source to the sample held by the sample holder attached to the goniometer; an X-ray detection measurement section that detects and measures X-rays diffracted or scattered by the sample; and a structure analysis section that performs a structure analysis of the sample based on the diffracted or scattered X-rays detected by the X-ray detection measurement section, wherein the soaking apparatus soaks the sample in the porous complex crystal of the sample holder.

(2) Further, it is a feature that the single-crystal X-ray structure analysis system according to the present invention is the system further comprising a pretreatment device, the pretreatment device including at least one of liquid chromatography, gas chromatography, supercritical fluid chromatography and an electrophoresis device, wherein the soaking apparatus comprises a control section with which the sample supplied by the pretreatment device is selectively introduced into and is soaked in the porous complex crystal of the sample holder.

(3) Further, it is a feature that in the single-crystal X-ray structure analysis system according to the present invention, the sample extracted by the pretreatment device is soaked in the porous complex crystal of the sample holder by adjusting a pressure of a flow passage with the control section.

(4) Further, it is a feature that in the single-crystal X-ray structure analysis system according to the present invention, the sample extracted by the pretreatment device is soaked in the porous complex crystal of the sample holder by adjusting a flow rate of the flow passage with the control section.

Effect of the Invention

According to the above-described present invention, a series of operations including soaking a sample in a very small and fragile crystalline sponge, followed by installing it in a device, and so forth from a pretreatment process can be quickly, surely and easily carried out by using newly proposed sample holder, applicator and soaking apparatus without accompanying conventionally precise and fine operations for which quickness is also required; in other words, a high-yield, efficient, very versatile and user-friendly single-crystal X-ray structure analysis system is provided. Thus, it becomes possible to make a single-crystal X-ray structure analysis with a crystalline sponge easily usable, and to widely spread it.

DETAILED DESCRIPTION OF EMBODIMENTS

Next, the single-crystal X-ray structure analysis system in which a crystalline sponge is utilized, according to one embodiment of the present invention, is described in detail referring to the attached drawings. In addition, the expression of "A or B" in the present application means "at least one of A and B", and includes "A and B" unless there are exceptional circumstances where there exists no possibility of A and B.

Figure 1:
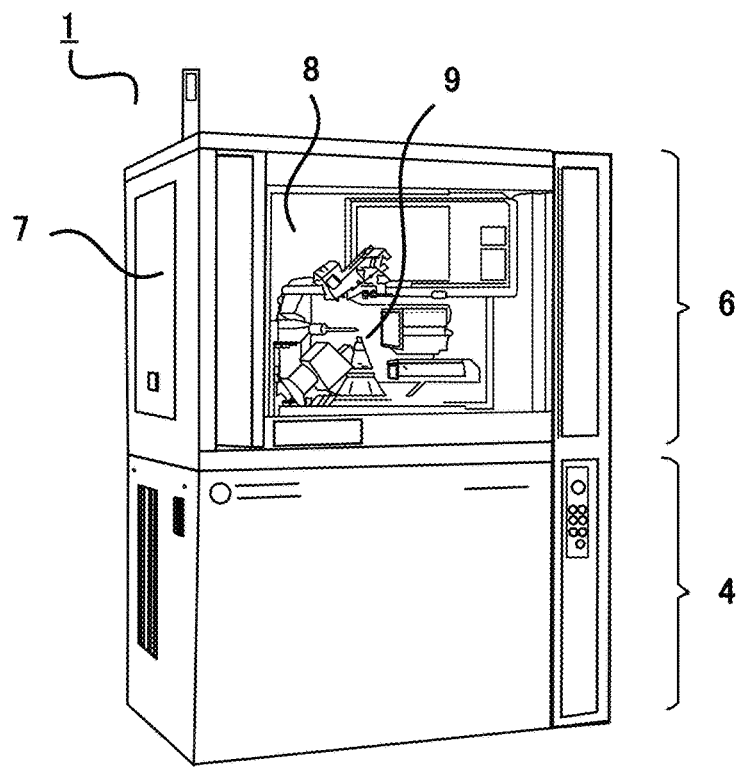
FIG. 1 is a diagram showing a whole configuration of a single-crystal X-ray diffractometer constituting a single-crystal X-ray structure analysis system according to one embodiment of the present invention.

The attached FIG. 1 shows the entire appearance configuration of a single-crystal X-ray structure analysis apparatus 1 including a single-crystal X-ray diffractometer according to one embodiment of the present invention, that constitutes a single-crystal X-ray structure analysis system, together with a soaking apparatus (soaking machine) by which a sample from outside as also described below is soaked in a crystalline sponge; and as is clear from the figure, the single-crystal X-ray structure analysis apparatus 1 comprises a base stand 4 in which a cooling device and an X-ray generation power supply unit are stored, and an X-ray protection cover 6 placed on the base stand 4.

The X-ray protection cover 6 is provided with a casing 7 for surrounding the single-crystal X-ray diffractometer 9, a door 8 provided in front of the casing 7, and so forth. The door 8 provided in front of the casing 7 is openable, and in this open state, various operations can be performed for the internal single-crystal X-ray diffractometer 9. In addition, the present embodiment as shown in the figure is directed to the single-crystal X-ray structure analysis apparatus 1 provided with the single-crystal X-ray diffractometer 9 for performing a structure analysis of a material using the crystalline sponge mentioned below.

Figure 2:
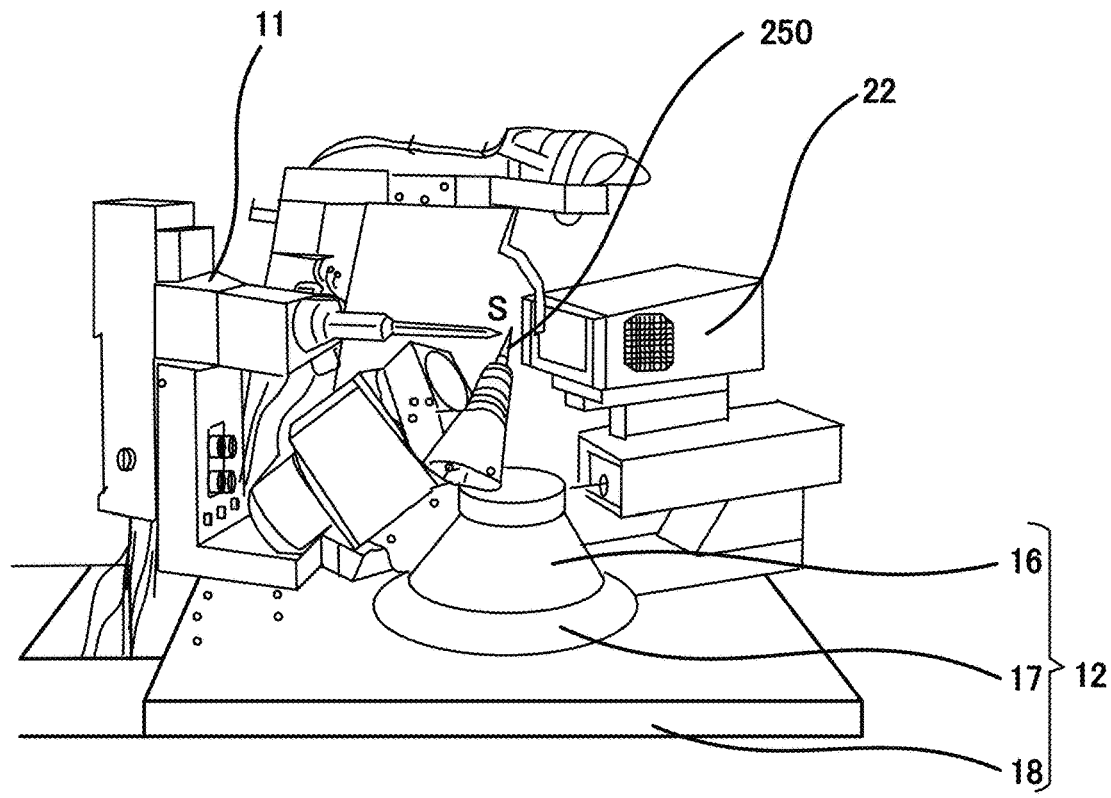
FIG. 2 is a diagram showing a configuration of the single-crystal X-ray diffractometer constituting.

The single-crystal X-ray diffractometer 9 comprises an X-ray tube 11 and a goniometer 12, as shown in FIG. 2 as well. The X-ray tube 11 comprises a filament, a target (referred to also as "anticathode") arranged so as to be opposed to the filament, and a casing for airtightly storing them, though not shown in the figure herein. This filament subjected to current applied by the X-ray generation power supply unit stored in the base stand 4 of FIG. 1 generates heat to emit thermal electrons. Further, a high voltage is applied between the filament and the target by the X-ray generation power supply unit, and the thermal electrons emitted from the filament are accelerated by the high voltage, and collide with the target. This collision area forms an X-ray focus, and X-rays are generated from the X-ray focus, and are spread out. In more detail, though not shown in the figure herein, the X-ray tube 11 comprising a microfocus tube and an optical element such as a multilayer focusing mirror or the like enables irradiation with higher brightness beam, and can also be selected from a radiation source such as Cu, Mo, Ag or the like. As exemplified above, the filament, the target arranged so as to be opposed to the filament, and the casing for airtightly storing them serve as an X-ray source, and a configuration for X-ray irradiation comprising the microfocus tube and the optical element such as the multilayer focusing mirror or the like serves as an X-ray irradiation section.

Further, the goniometer 12 supporting a sample S to be analyzed comprises a θ rotation table 16 that is rotatable with a sample axis line ω passing through an X-ray incident point of the sample S as a center, and a 2θ rotation table 17 that is arranged around the θ rotation table 16 and is rotatable with the sample axis line ω as a center. In addition, according to the present embodiment, the sample S is soaked inside a crystalline sponge previously attached to a part of the sample holder 250 mentioned below. Driving devices (not shown in the figure) for driving the above-described θ rotation table 16 and 2θ rotation table 17 are stored inside a base 18 of the goniometer 12, and the θ rotation table 16 is driven by these driving device to be intermittently or continuously rotated at a predetermined angular speed so as to make a so-called θ rotation. Further, the 2θ rotation table 17 is driven by these driving device to be intermittently or continuously rotated so as to make a so-called 2θ rotation. The above-described driving device can be constituted from any structure, and for example, can be constituted from a power transmission structure comprising a worm and a worm wheel.

An X-ray detector 22 is placed on a part of the outer periphery of the goniometer 12, and the X-ray detector 22 is constituted from for example, CCD type and CMOS type two-dimensional pixel detectors, a hybrid type pixel detector, or the like. In addition, an X-ray detection measurement section means a configuration in which X-rays diffracted or scattered by the sample are detected and measured, and comprises the X-ray detector 22 and a control section that controls the same.

The single-crystal X-ray diffractometer 9 is constituted as described above, and thus the sample S is θ-rotated with the sample axis line ω as a center by the θ rotation of the θ rotation table 16 in the goniometer 12. During the θ rotation of this sample S, X-rays generated from the X-ray focus inside the X-ray tube 11, that is directed to the sample S enter the sample S at a predetermined angle, and are diffracted/scattered. That is, the incident angle of X-rays entering the sample S changes depending on the θ rotation of the sample S.

When the Bragg diffraction condition between an incident angle of X-rays entering the sample S and a crystal lattice plane is satisfied, diffraction X-rays are generated from the sample S. The diffraction X-rays are received by the X-ray detector 22 to measure an X-ray intensity thereof. From those described above, an angle of the X-ray detector 22 with respect to the incident X-rays, that is, an intensity of the diffraction X-rays corresponding to a diffraction angle is measured, and a crystal structure concerning the sample S and so forth are analyzed from this measurement result.

Figure 3A:
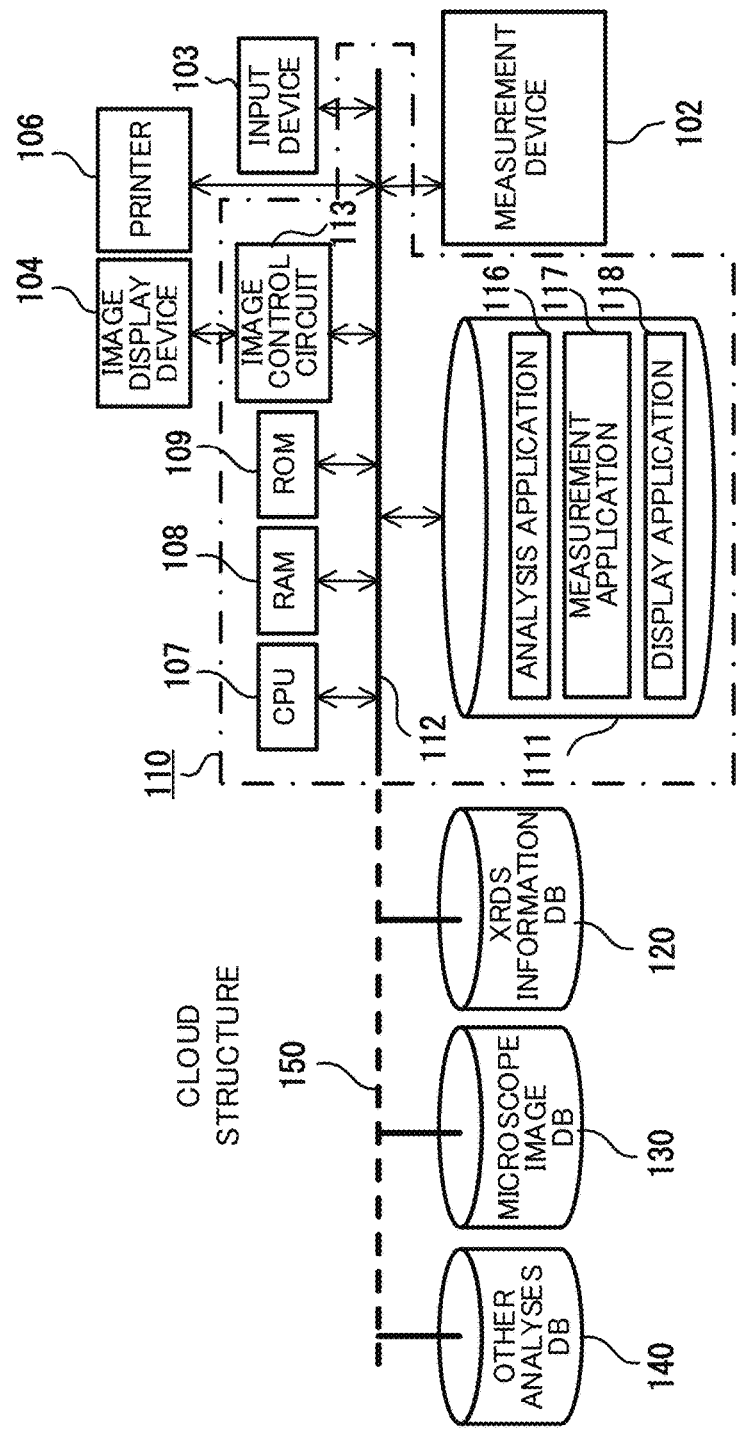
FIG. 3A is a block diagram showing an electrical configuration inside the above-described single-crystal X-ray structure analysis apparatus.

Next, FIG. 3A shows one example of the detail of an electrical internal configuration constituting a control section 110 in the above-described single-crystal X-ray structure analysis apparatus. In addition, as a matter of course, the present invention is not limited to the following embodiments according to the present invention.

This single-crystal X-ray structure analysis apparatus 1 includes the above-described internal configuration and further comprises a measurement device 102 for measuring a suitable material used as a sample; an input device 103 constituted from a keyboard, a mouse and so forth; an image display device 104 as display means; a printer 106 as means for printing and outputting the analysis result; CPU (Central Processing Unit) 107; RAM (Random Access Memory) 108; ROM Read Only Memory) 109; a hard disk 111 as an external storage medium, and so forth. These elements are electrically connected mutually by a bus 112.

The image display device 104 constituted from an image display unit such as a CRT display, a liquid-crystal display or the like displays an image on a screen in accordance with an image signal generated by an image control circuit 113. The image control circuit 113 generates the image signal based on image data input therein. The image data input in the image control circuit 113 is generated by an operation of every kind of calculation means, achieved by a computer comprising CPU 107, RAM 108, ROM 109, and the hard disk 111. An inkjet plotter, a dot printer, an inkjet printer, an electrostatic transfer printer, or any other printing unit having arbitrary structure is usable for the printer 106. In addition, the hard disk 111 can also be constituted from a magneto-optical disk, a semiconductor memory, or any other storage medium having arbitrary structure.

Analysis application software 116 for managing the overall operation of the single-crystal X-ray structure analysis apparatus 1, measurement application software 117 for managing the operation of the measurement processing using the measurement device 102, and display application software 118 for managing the operation of the display processing using the image display device 104 are stored inside the hard disk 111. A predetermined function is achieved after reading these pieces of application software from the hard disk 111, as needed, to transfer them to RAM 108.

This single-crystal X-ray structure analysis apparatus 1 further comprises for example, a database placed in a cloud area, the database for storing every kind of measurement results including measurement data obtained by the above-described measurement device 102. Referring to an example of the figure, as is explained below, an XRDS information database 120 that stores XRDS image data obtained by the above-described measurement device 102, and a microscope image database 130 that stores actually observed images obtained by the microscope, are shown, and further for example, measurement results obtained via analysis performed with not X-rays but XRF, Raman ray or the like, and another analysis database 140 that stores physical property information, are shown. In addition, these databases are not necessarily stored inside the single-crystal X-ray structure analysis apparatus 1, and for example, they may be provided outside and be communicably connected mutually via a network 150 or the like.

Figure 3B:
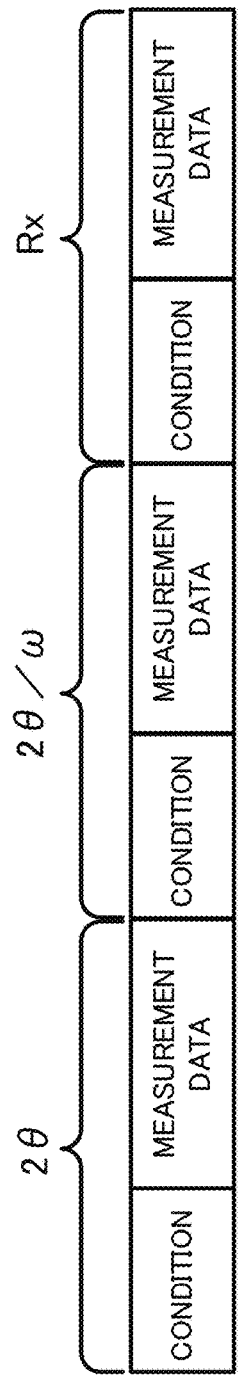

A method of storing individual measurement data inside an individual file is also taken into account as a file management method for storing a plurality of pieces of measurement data inside a data file, but according to the present embodiment, as shown in FIG. 3B, the plurality of pieces of measurement data are set to be continuously stored inside one data file. In addition, referring to FIG. 3B, storage areas each in which "condition" is written are an area for storing every kind of information including device information and measurement condition when obtaining the measurement data.

As such measurement conditions, (1) name of measurement object material, (2) type of measurement device, (3)

measurement temperature range, (4) measurement start time, (5) measurement end time, (6) measurement angle range, (7) moving speed in scanning movement system, (8) scanning condition, (9) type of X-rays incident on sample, (10) whether or not to use attachments such as a sample high-temperature device, and so forth, are conceivable and every kind of other conditions is also conceivable.

Figure 4:
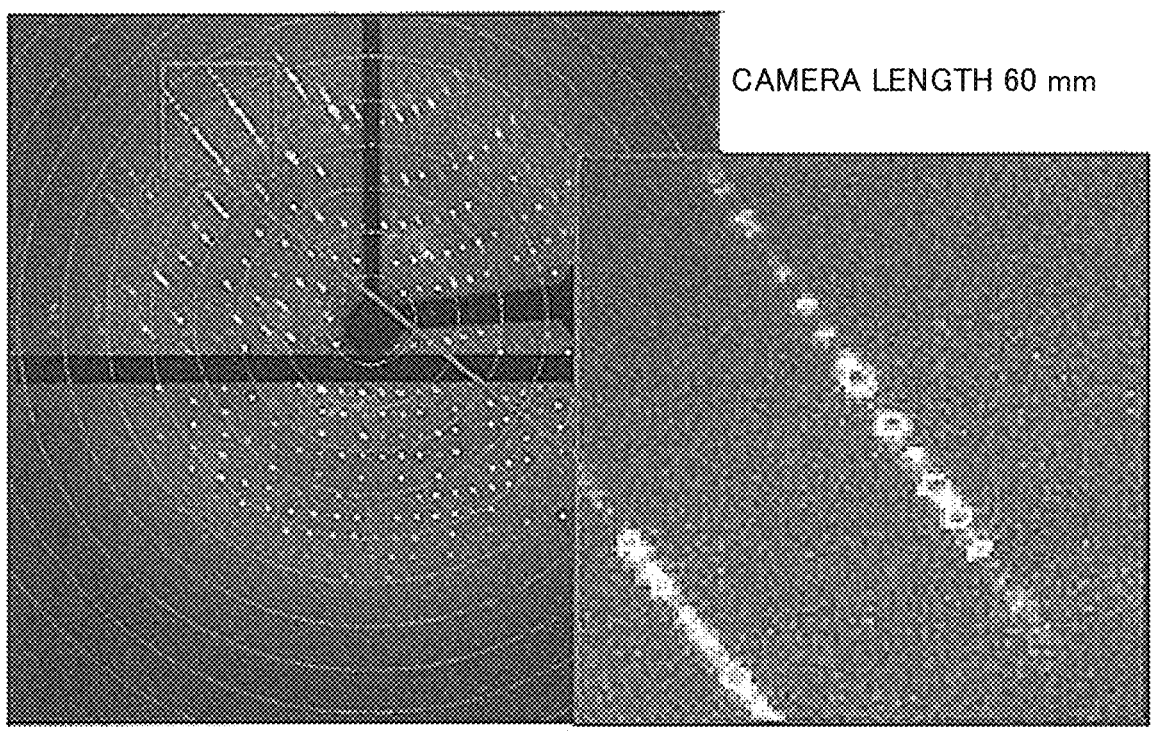
FIG. 4 is a diagram including a photograph showing an XRDS pattern or an image obtained by the above-described single-crystal X-ray structure analysis apparatus.

An XRDS (X-ray Diffraction and Scattering) pattern or an image (Refer to FIG. 4) is obtained by receiving/accumulating X-rays received on a flat plane that is a two-dimensional space of the X-ray detector 22 constituting the above-described measurement device 102 for each pixel arranged in planar array, that constitutes the detector, and by measuring an intensity thereof. For example, a pattern or an image on a two-dimensional space of r and θ can be obtained by detecting the intensity of X-rays received via an integral, for each pixel of the X-ray detector 22.

<Measurement Application Software>

The XRDS pattern or the image on an observation space, that is obtained by diffraction and scattering of X-rays caused by an object material for irradiation of the X-rays reflects information of an electron density distribution in an actual space of the object material. However, the XRDS pattern being on the two-dimensional space of r and θ does not directly represents symmetry in the actual space of the object material as a three-dimensional space. Accordingly, it is generally difficult to specify the (spatial) arrangement of atoms and molecules that constitute the material with only the existing XRDS image, and thus a specialized knowledge of X-ray structure analysis is required. Therefore, according to the present example, automatization is achieved by adopting the above-described measurement application software. In this manner, the single-crystal X-ray structure analysis apparatus 1 receives and manages every kind of measurement results including measurement data obtained by detecting X-rays diffracted or scattered by a sample with the X-ray detection measurement section while controlling a measurement processing operation using the measurement device 102. Further, the sample is subjected to structure analysis with a structure analysis section, based on every kind of measurement results including the measurement data obtained by detecting the X-rays diffracted or scattered by the sample.

Figure 5A:
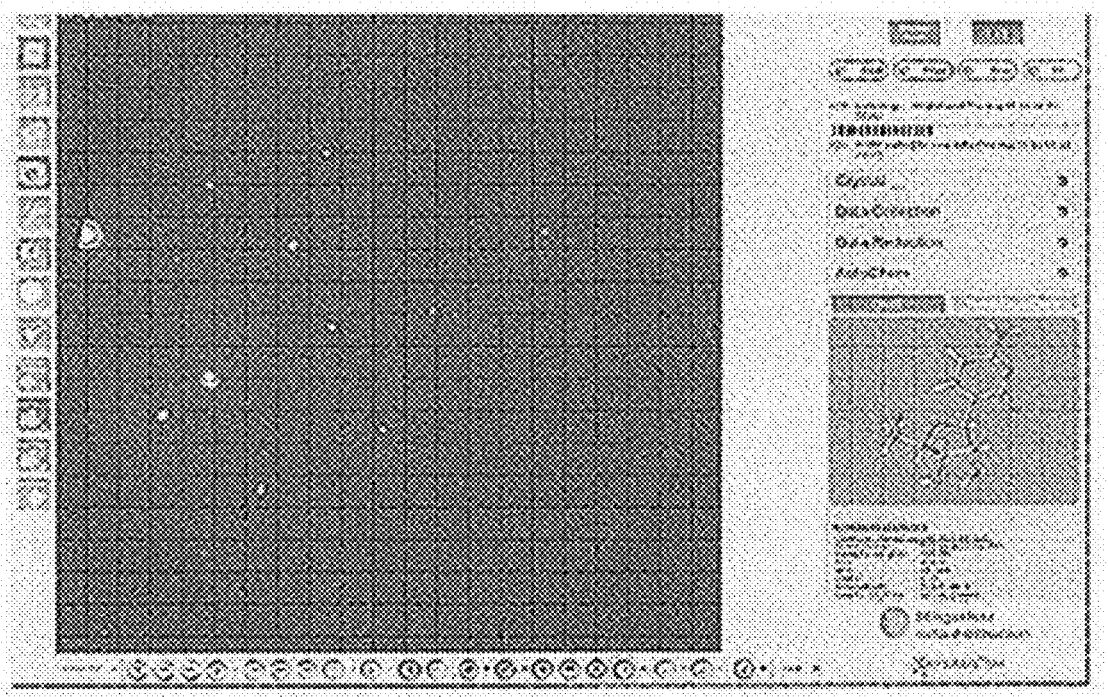
FIGS. 5A (5B) is a diagram including a photograph showing one example of a screen obtained by executing X-ray diffraction data measurement/processing software on the above-described single-crystal X-ray structure analysis apparatus.
Figure 5B:
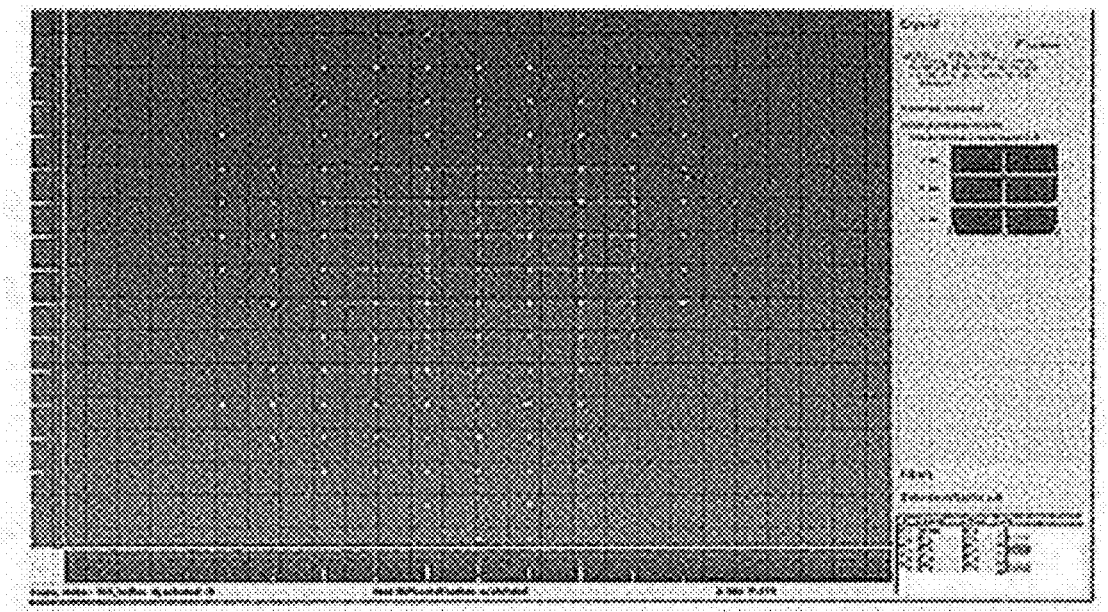
Figure 6:
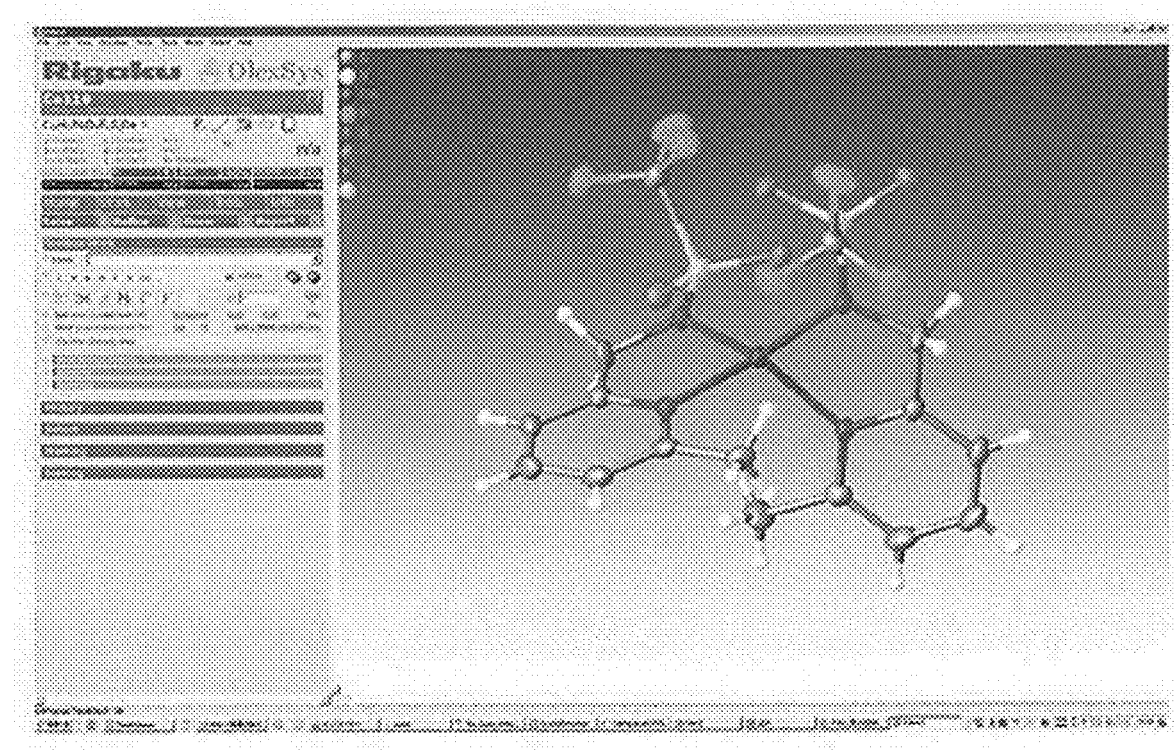
FIG. 6 is a diagram including a screen showing a molecular model prepared using a structure analysis program of the above-described single-crystal X-ray structure analysis apparatus.

For one example, as shown in the execution screens of FIGS. 5A and 5B, X-ray diffraction data measurement/processing software called "CrysAlis$^{Pro}$" that is a platform for single-crystal structure analysis is installed to execute preliminary measurement, setting of measurement conditions, main measurement, data processing and so forth. Further, structure analysis and structure refinement are executed in parallel with X-ray diffraction data collection by installing an automatic structure analysis plug-in called "AutoChem". Then, from space group determination to phase determination, construction and correction of molecular modelling, structure refinement, final reporting, and preparation of a CIF file are executed by a structure analysis program called "Olex$^2$" as also shown in FIG. 6.

The whole structure of the single-crystal X-ray structure analysis apparatus 1, and its function have been described as above; and a crystalline sponge according to the present invention, and devices and tools related thereto, together with a soaking apparatus (soaking machine) constituting a single-crystal X-ray structure analysis system of the present invention are specifically described below in detail, referring to the attached drawings.

<Crystalline Sponge>

As described above, the single-crystal X-ray structure analysis has become widely applicable for those including a liquid compound that cannot be crystallized, a very small amount of a sample with several ng to several μg that is incapable of acquiring a sufficient amount to perform crystallization, or the like via development of a material called "crystalline sponge" as a very small and fragile porous complex crystal having an approximate size of several 10 μm to several 100 μm, in whose inside countless pores each having a diameter of 0.5 to 1 nm are formed.

However, in the current situation, in order to perform soaking (post-crystallization) as crystallization of a sample into a framework of the above-described crystalline sponge, as previously described, required is a step of soaking a very small amount of a sample, approximately several ng to several μg, separated by every kind of pretreatment (separation) devices in a framework of a very small and fragile crystalline sponge having an outer diameter of approximately 100 μm provided via immersion in a preserving solvent (carrier) such as cyclohexane or the like, inside a container. Subsequently, further required is a step of taking out, from a container, a very small, fragile and difficultly handleable crystalline sponge in a quick manner (in a short period of time in such an extent that the crystalline sponge is not broken due to drying), and accurately attaching it to an X-ray irradiation position inside a single-crystal X-ray diffractometer, more specifically, to a tip portion of a sample axis of the goniometer 12 (so-called goniometer head pin) while performing centering.

Specifically, when a sample of the very small amount of approximately several ng to several μg is soaked in a framework of a very small and fragile crystalline sponge having an outer diameter of approximately 100 μm, the sample of a required amount needs to be introduced into and surely soaked in the crystalline sponge without wasting the sample of this very small amount. These steps are not only fine operations for which high preciseness is required but also those for which quickness is required for the operator, regardless of presence/absence of a specialized knowledge of X-ray structure analysis, thereby resulting in having a large influence on the measurement result of a sample after being soaked in the crystalline sponge. That is, these operations make single-crystal X-ray structure analysis using a very small crystalline sponge result in low yield, and thus this becomes one of the causes of suppressing the single-crystal X-ray structure analysis using the crystalline sponge from being widely used.

The present invention that has been accomplished based on the above-described inventor's knowledge enables quickly, surely and easily performing a single-crystal X-ray structure analysis with a very small and fragile crystalline sponge by utilizing a soaking apparatus (soaking machine) 500 as described in detail below while using a sample holder for the crystalline sponge (also referred to simply as a sample holder) and an applicator that is a handling (operating) tool thereof as described below, in other words, achieves a high-yield, efficient, very versatile and user-friendly single-crystal X-ray structure analysis system. That is, as to the next-generation single-crystal X-ray structure analysis system according to the present invention, there is a large constraint that the very small and fragile crystalline sponge in which a very small amount of a sample S is soaked is prepared, and further the sample S (crystalline sponge) needs to be taken up from a soaking container and precisely and quickly attached to a predetermined position at the tip portion of the goniometer 12 in a short and quick period of time in such an extent that the crystalline sponge is not broken due to drying, but specifically in order to achieve the very versatile and user-friendly apparatus, such operations need to be made quickly and easily executable without requiring highly specialized knowledge as well as operation preciseness.

The present invention resolves such a problem, that is, provides a system for performing a high-yield efficient, very versatile and user-friendly single-crystal X-ray structure analysis in a quick, sure and easy manner by anyone by further utilizing a soaking apparatus (soaking machine) in addition to a sample holder and an applicator that are proposed in the present invention, while also using a very small, fragile and difficultly handleable crystalline sponge; and is described below in detail with a tool used therefor.

Figure 7A:
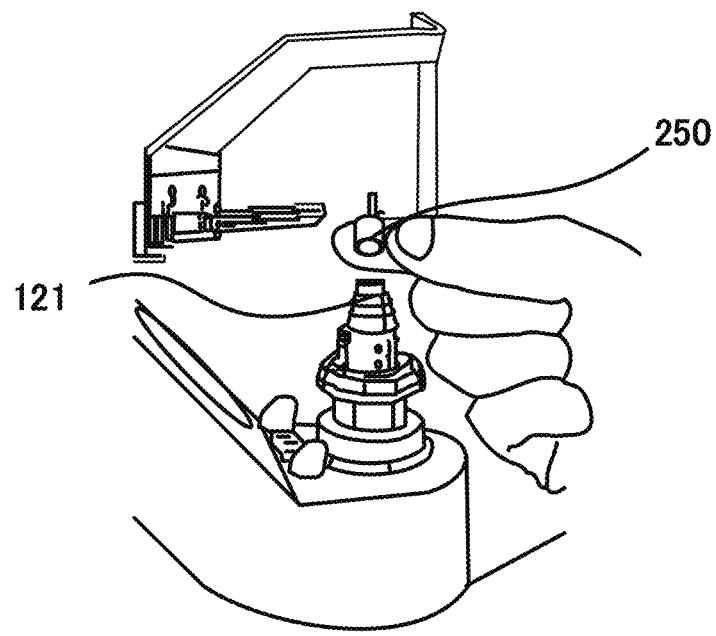
FIG. 7A is a diagram including a photograph showing one example of a structure centering on a goniometer of the above-described single-crystal X-ray diffractometer.
Figure 7B:
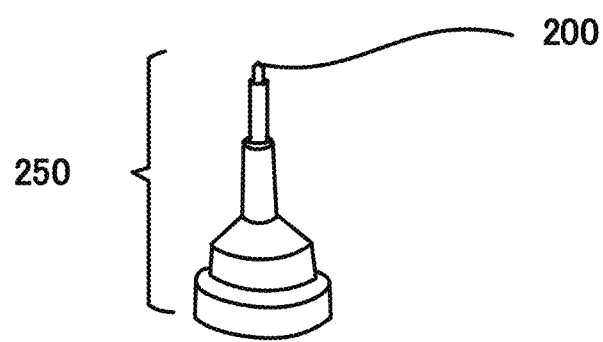

FIG. 7A shows a tip portion of the goniometer 12 in an enlarged view, and this figure shows a state that, the sample holder 250, being in an enlarged view as FIG. 7B, as a tool where the crystalline sponge 200 soaking a sample to be analyzed that is proposed according to the present invention is attached (mounted) to the goniometer head 121 as the tip portion of the goniometer 12 in advance. In addition, the sample holder 250, for example, can be attached/detached to/from the goniometer head 121 at the tip portion of the goniometer 12 by an attaching/positioning mechanism for which magnetic force or the like is used, and can be attached easily and accurately at an exact position by anyone.

<Sample Holder for Crystalline Sponge, and Applicator>

Figure 8:
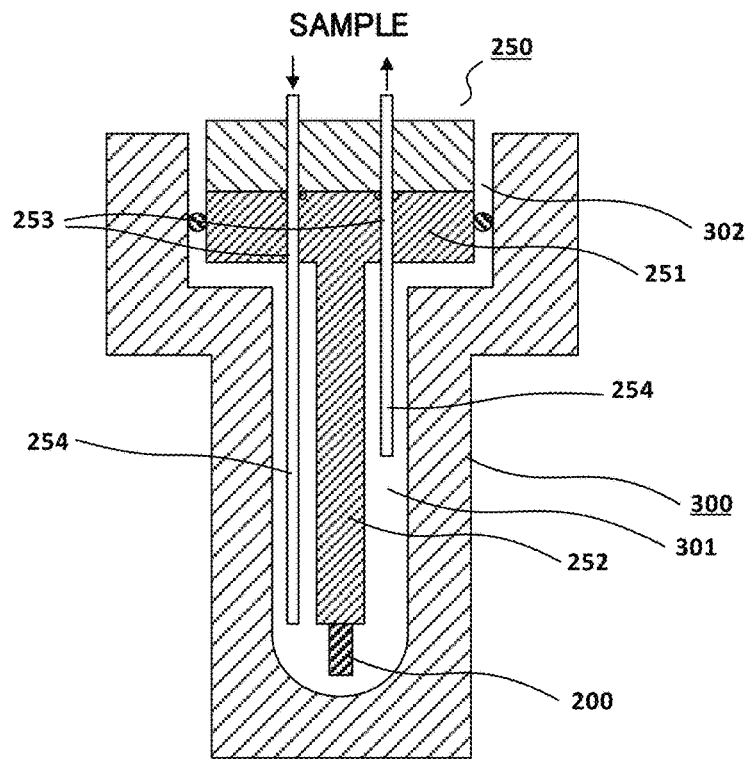
FIG. 8 is a sectional view showing one example of a sample holder to be attached to the above-described goniometer.

FIG. 8 shows a sectional view of the above-described sample holder 250. In the sample holder 250, a pin (cylinder)-shaped sample holding part (hereinafter, referred to simply as a holding part) 252 (corresponding to the so-called goniometer head pin) is implanted vertically in the center of one surface (the lower surface in the figure) of the base part 251 of a disk or corn-shaped holder made of metal or the like attached to the goniometer head 121 {Refer to FIG. 7A} at the tip portion of the goniometer 12, and the crystalline sponge 200 in which the above-described sample to be analyzed is soaked is combinedly attached and fixed to the sample holder 250 beforehand at a predetermined position of the tip of the pin-shaped holding part 252. Further, the positioning mechanism or the like such as a magnet that is not shown in the figure, or the like is provided on the other surface (upper surface in the figure) of the disk-shaped base part 251. The sample holder 250 is detachably attached to the tip portion of the goniometer 12 by this positioning mechanism.

Further, in FIG. 8, the so-called applicator 300 used with the sample holder 250 is shown as a handling (operating) tool for soaking the sample in the crystalline sponge 200 attached to the sample holder in advance. This applicator 300 is, for example, formed from a transparent or non-transparent member made of glass, a resin, metal or the like, in whose inside a storing space 301 for storing the above-described sample holder 250 is formed, and at whose upper portion the opening 302 through which the sample holder 250 is fitted and taken out is further formed.

Further, for example, seal portions (each shown by o in the figure) are provided at part of the opening 302 of the applicator 300 so as to be airtightly maintained from outside in a state of storing the sample holder 250 in the storing space 301 in an inside thereof. On the other hand, a pair of fine through holes 253, 253 for introducing a sample to be analyzed into the crystalline sponge 200 located inside (storing space 301) the applicator 300 are formed at the base part 251 of the sample holder 250. The fine holes 253, 253 exhibit preferable one example of a sample introduction structure, and other structures may be adopted. In addition, though not shown in the figure, seal portions are provided for these fine holes 253, 253. In this manner, as shown in the figure, the storing space 301 inside the applicator 300 is kept airtight even in a state where sample introduction tubes (hereinafter, referred to simply as introduction tubes) 254, 254 for introducing the sample into the crystalline sponge 200 are inserted in the fine holes 253, 253.

According to the sample holder 250 with such a configuration, alternatively, further via being combinedly provided (unitized) with the applicator 300 as a handling (operating) tool thereof, the crystalline sponge 200 attached to the tip portion of the pin-shaped holding part 252 (corresponding to a goniometer head pin) constituting a part of the sample holder 250 can be safely and easily handled with neither damage, nor deviation from the sample holder 250. That is, the crystalline sponge 200 in which a very small amount of sample is soaked can be safely, simply and easily prepared on the goniometer head 121 in a short and quick period of time in such an extent that no damage occurs due to drying, without any damage due to taking only it out from a soaking container unlike a conventional manner. According to the present example, the sample holder 250 with which soaking of the sample is completed is removed from the applicator 300, and is attached to the goniometer head 121 {Refer to FIG. 7A} at the tip portion of the goniometer 12. In this manner, the sample S soaked in the crystalline sponge 200 is easily, precisely and quickly arranged at a predetermined position inside the single-crystal X-ray diffractometer 9 without requiring highly specialized knowledge and precise operations.

Figure 9:
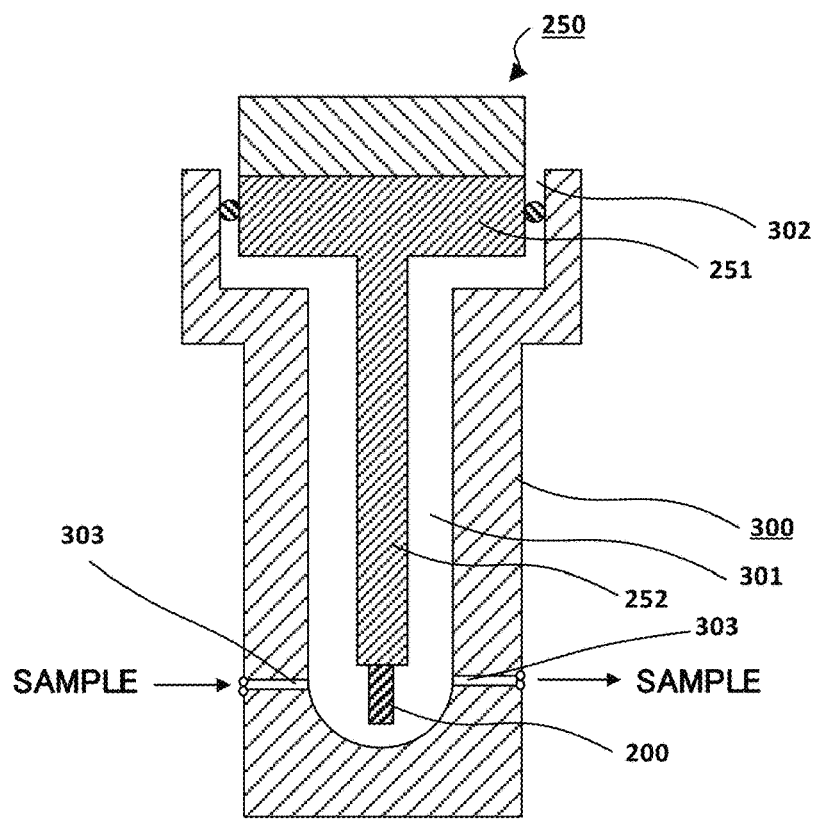
FIG. 9 is a sectional view showing a structure of the sample holder including an applicator according to another example of the present invention.
Figure 10:
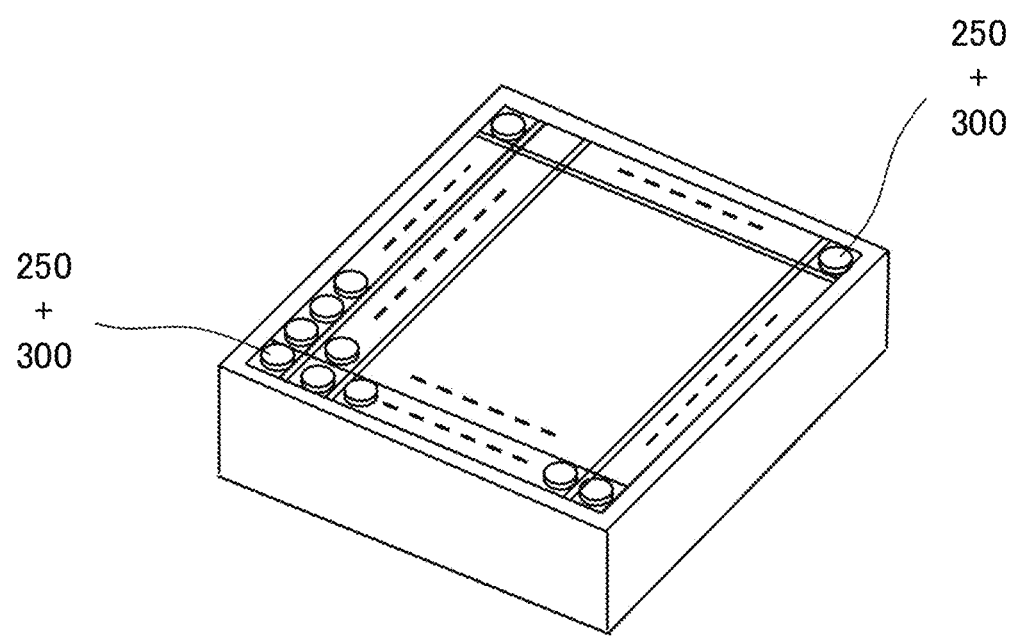
FIG. 10 is a diagram showing one example of a state in a case of providing the above-described sample holder as a set.

In addition, it has been explained in the above-described example that a pair of fine through holes 253, 253 for introducing a sample to be analyzed into the crystalline sponge 200 located inside (storing space 301) the applicator 300 are formed in part of the base part 251 of the sample holder 250, but the present invention is not limited thereto, and for example, these fine holes may be formed in part of the applicator 300 as shown in FIG. 9 by symbols 303, 303. Further, when introducing the sample to be analyzed into the crystalline sponge 200, by using a soaking apparatus (soaking machine) with which one example is described below, more specifically, by inserting a pair of sample introduction tubes 254, 254 from the apparatus in fine through holes 253, 253 (or 303, 303), and a very small amount of the sample into the above-described very small crystalline sponge 200, it is possible to soak the sample in the necessary crystalline sponge 200. Further, the sample holder 250 can be integrated (unitized) with the applicator 300 as a handling (operating) tool thereof, and further can be provided as a so-called set by preparing the required number of them for the analysis operation and storing them in a box-shaped case, as also shown in FIG. 10.

The sample is sent to the sample introduction tube 254 on the supply side from a tube on the supply side, and is supplied to the sample holder 250 inside the applicator 300 from the tip portion of the sample introduction tube 254 on the supply side. Only the sample, or a solution in which the sample and the preserving solvent (carrier) are mixed is supplied by flowing inside the sample introduction tube 254 on the supply side. In this manner, a very small amount of the sample S introduced thereto comes into contact with the crystalline sponge 200 attached to the tip of the pin-shaped holding part 252 of the sample holder 250 inside the storing space 301 of the applicator 300, and the sample is soaked therein. When using the soaking device 500, in a state where the sample is injected, the excessive sample or a solution in which the sample and the preserving solvent (carrier) are mixed is discharged from the sample introduction tube 254 on the discharge side, after a predetermined time has elapsed. When not using the soaking device 500, the unnecessary preserving solvent (carrier) or solution flows inside the sample introduction tube 254 on the discharge side, and is discharged. Accordingly, it is possible that no sample flows through the sample instruction tube 254 on the discharge side. When using gas or supercritical fluid as a carrier, the carrier containing the sample is discharged.

<Pretreatment of Sample, and Soaking of it to Sample Holder for Crystalline Sponge by Soaking Apparatus>

Figure 11:
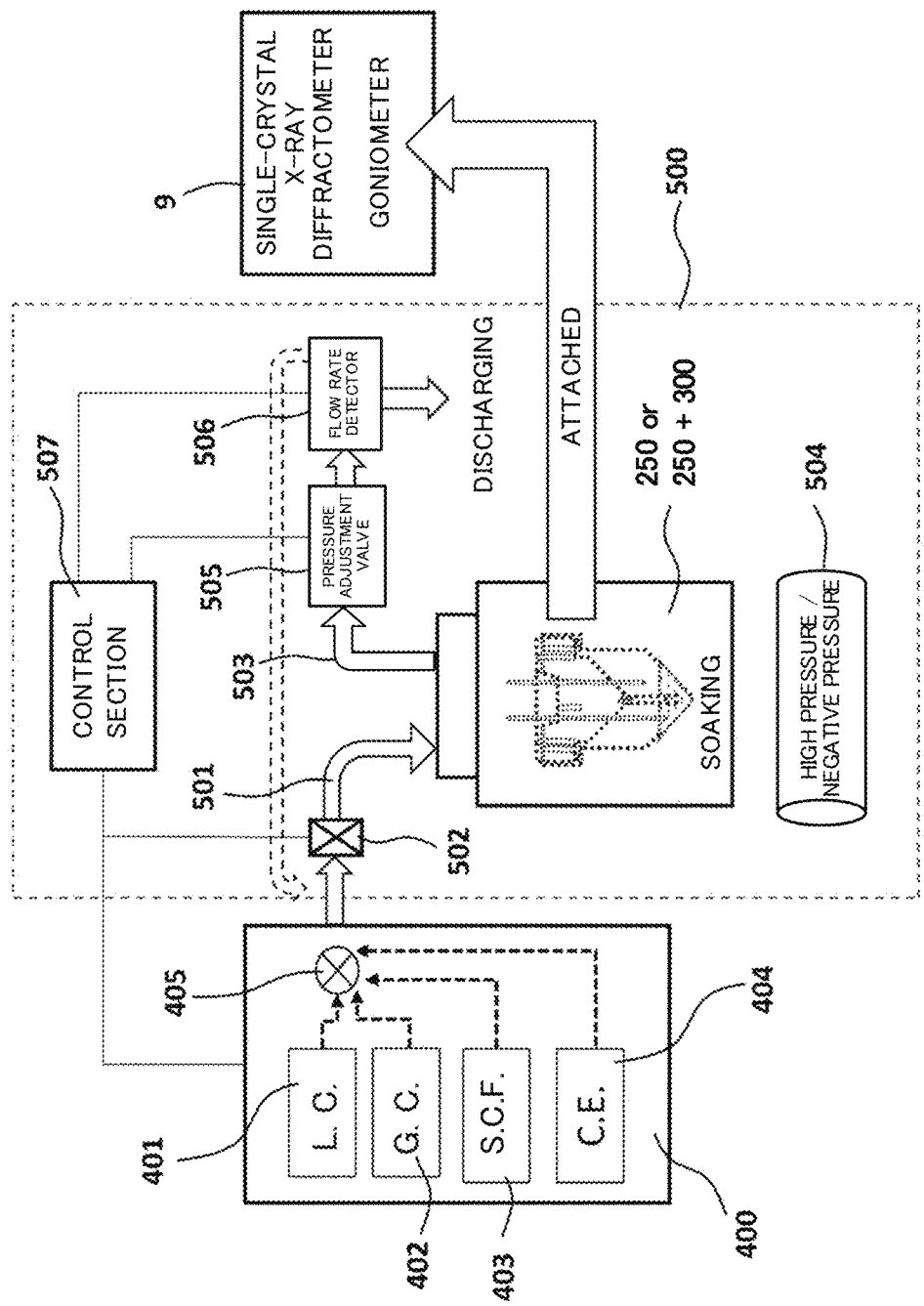
FIG. 11 is a conceptual diagram of the system showing a soaking apparatus (soaking machine) constituting the single-crystal X-ray structure analysis system according to the present invention, together with a pretreatment device.

Performing separation/extraction of a sample soaked in the above-described crystalline sponge is made by a pretreatment device 400. More specifically, as shown in FIG. 11, examples of the pretreatment device 400, for example, include LC (liquid chromatography) 401, GC (gas chromatography) 402, and further, SFC (supercritical fluid chromatography) 403, CE (capillary electrophoresis) 404 and so forth; and these devices each are appropriately selected and used according to types of sample to be analyzed. For example, protein or the like is extracted by LC 401, and a very small amount of liquid sample obtained by it is supplied to an external device via a selection valve 405. In addition, examples of the electrophoresis device herein include various electrophoresis devices concerning capillary electrophoresis, isoelectric point electrophoresis, and so forth.

<Soaking Apparatus (Soaking Machine)>

The soaking apparatus (soaking machine) 500 constituting the single-crystal X-ray structure analysis system together with the single-crystal X-ray structure analysis apparatus 1 is an apparatus with which a sample is soaked in a crystalline sample by allowing a very small amount of sample obtained outside the apparatus through the above-described pretreatment to flow thereinto via part (Refer to a pair of fine through holes 253 in FIG. 8, and a pair of fine through holes 303 in FIG. 9, for example) of the sample holder 250 and the applicator 300, in a state (pressure or flow rate) adapted to a type or a state of the resulting sample. That is, the soaking apparatus 500 does not constitute the single-crystal X-ray structure analysis apparatus 1, but by using it, it is made possible to surely introduce a very small amount of sample into a crystalline sponge 200 by a required amount, and to soak a necessary sample thereof therein.

As shown in FIG. 11, the soaking apparatus (soaking machine) 500 connected to the pretreatment device 400 constituted from LC 401, GC 402, SCF 403 or CE 404 comprises an introduction tube 501 into which a sample selectively supplied from the foregoing device is introduced, and there is provided a valve 502 (openable/closable) capable of turning on/off, that is connected in the middle of the introduction tube 501. Further, the output side is connected to the sample holder 250 as well as the applicator 300 as described above, more specifically, to one fine hole 253 (Refer to FIG. 8) of the sample holder 250, or to one fine hole 303 (Refer to FIG. 9) of the applicator 300. On the other hand, a pressure adjustment valve 505 for adjusting pressure on a discharging tube side, a flow rate detector 506 for detecting a flow rate or a flow speed of a fluid flowing inside a discharging tube 503, and so forth are provided in the middle of the discharging tube 503 for discharging a sample as well as a carrier that has become unnecessary in a soaking step thereof. Further, a high pressure/negative pressure source 504 including a compressor and a vacuum pump for generating necessary high pressure and negative pressure is provided inside the soaking apparatus 500, and by appropriately using the high pressure and the negative pressure that are generated in this manner, as to a sample supplied from the soaking apparatus 500, the sample is introduced into the crystalline sponge 200 attached to part of the sample holder 250 (or the sample holder 250 stored inside the applicator 300) in a state (pressure or flow rate) adapted to a type or a state of the sample by the flow rate detector 506 in addition to the above-described valve 502 and pressure adjustment valve 505. Further, symbol 507 in the figure represents a so-called control section for controlling an operation at each section constituting the soaking apparatus 500, based on a signal detected inside the apparatus, and information from the pretreatment device 400 and the single-crystal X-ray diffractometer 9. Further, a sample including a carrier after passing through the flow rate detector 506 may be discharged as it is, or be returned to the introduction tube 501 side as shown in the figure by a dashed line.

In this manner, when utilizing the above-described soaking apparatus (soaking machine) 500, a very small amount of sample selectively introduced from the introduction tube 501 by appropriately adjusting pressure applied onto each of the introduction tube 501 side and the discharging tube 503 side is surely supplied to the sample holder 250 as well as the applicator 300, irrespective of a state thereof (liquid, gas, or supercritical fluid), and thus it is made possible to introduce it into the crystalline sponge 200. Further, a very small amount of sample to be analyzed, can also be selectively introduced into the sample holder 250 as well as the applicator 300 with a fluid supplied from the pretreatment apparatus 400 by controlling opening/closing of the on/off valve 502, while detecting a flow rate (or flow speed) of a fluid flowing inside the discharging tube 503 with the flow rate detector 506. That is, according to the case where the soaking apparatus 500 is utilized, a very small amount of sample is introduced into an inner space 301 of the applicator 300 and is soaked in the crystalline sponge 200 attached to the tip of the pin-shaped holding part 252 constituting the sample holder 250, and thus it becomes possible that the sample is easily and surely soaked therein. Then, the crystalline sponge 200 with which soaking thereof is completed is removed from the applicator 300 together with the sample holder 250, and is attached to the tip portion of the goniometer 12, for example, by using a positioning mechanism such as magnetic force or the like.

<Single-Crystal X-Ray Structure Analysis Method Using Sample Holder for Crystalline Sponge, and Soaking Apparatus (Soaking Machine) Thereof>

Next, with regard to the above-described single-crystal X-ray structure analysis apparatus 1 constituting the single-crystal X-ray structure analysis system according to the present invention, the single-crystal X-ray structure analysis method executed by using the soaking apparatus (soaking machine) 500 constituting the system as well, together with the sample holder 250 is described as below.

Figure 12:
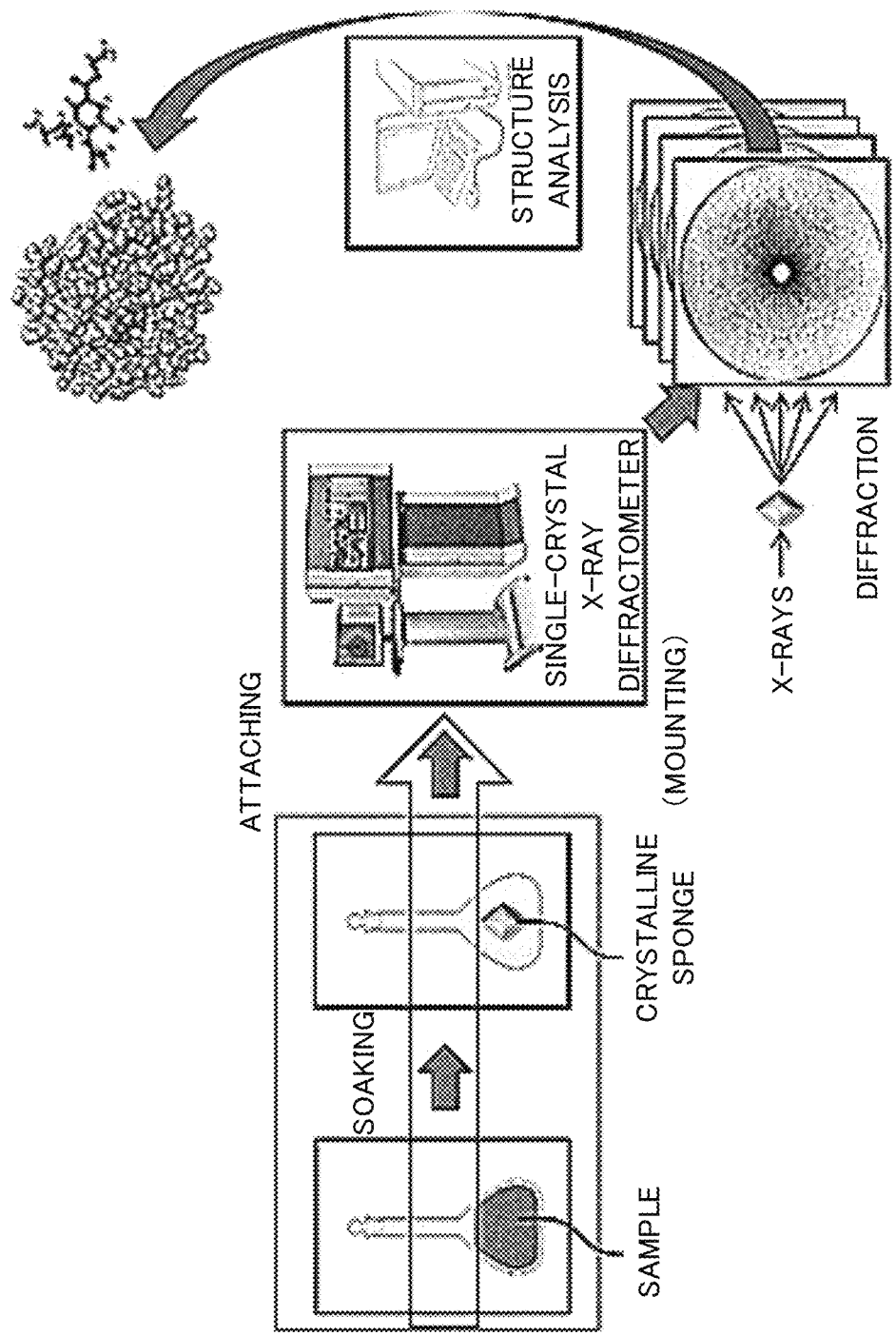
FIG. 12 is a flow diagram showing one example of a single-crystal X-ray structure analysis method with regard to the above-described system.

The single-crystal X-ray structure analysis method using the sample holder 250 according to one example of the present invention is conceptualized and shown in FIG. 12. In such a method, a very small amount of sample in every type of states, that is extracted and supplied by the pretreatment device 400 is surely and easily soaked in the crystalline sponge 200 previously attached to the tip portion of the pin-shaped holding part 252 of the sample holder 250, and soaking the very small amount of sample therein can be performed by utilizing the above-described soaking apparatus 500. Then, the applicator 300 is removed from the sample holder 250, and the sample holder 250 having been removed therefrom is quickly attached to the tip portion (goniometer head 121) of the goniometer 12 constituting the single-crystal X-ray diffractometer 9. In this manner, the crystalline sponge 200 previously attached to the tip portion of the pin-shaped holding part 252 of the sample holder 250, with which soaking thereof is completed by the soaking apparatus 500 is precisely arranged at a predetermined position upon irradiation with X-rays inside the single-crystal X-ray diffractometer 9. Thereafter, the sample S whose soaking therein is completed according to θ rotation of the goniometer 12 is irradiated with X-rays from the X-ray tube 11, and diffraction X-rays are generated from the sample S. The diffraction X-rays are received by the above-described X-ray detector 22 to measure an X-ray intensity thereof, resulting in an XRDS pattern or an image, and a crystal structure and so forth regarding the sample are analyzed by the above-described measurement application software.

In this manner, when utilizing the above-described soaking apparatus 500 together with newly proposed sample holder 250 and applicator 300, in addition to the single-crystal X-ray structure analysis apparatus 1, a very small amount of sample is soaked in the crystalline sponge 200 in very small size to prepare a sample to be analyzed, and the soaked sample S can be quickly, easily and precisely attached to the tip portion of the goniometer 12 in the above-described single-crystal X-ray structure analysis apparatus by anyone. Consequently, it becomes possible that constructing a molecular model, preparing a final report, and so forth can be easily carried out by measuring X-rays diffracted and scattered by an object material while irradiating X-rays of required wavelength.

Figure 13:
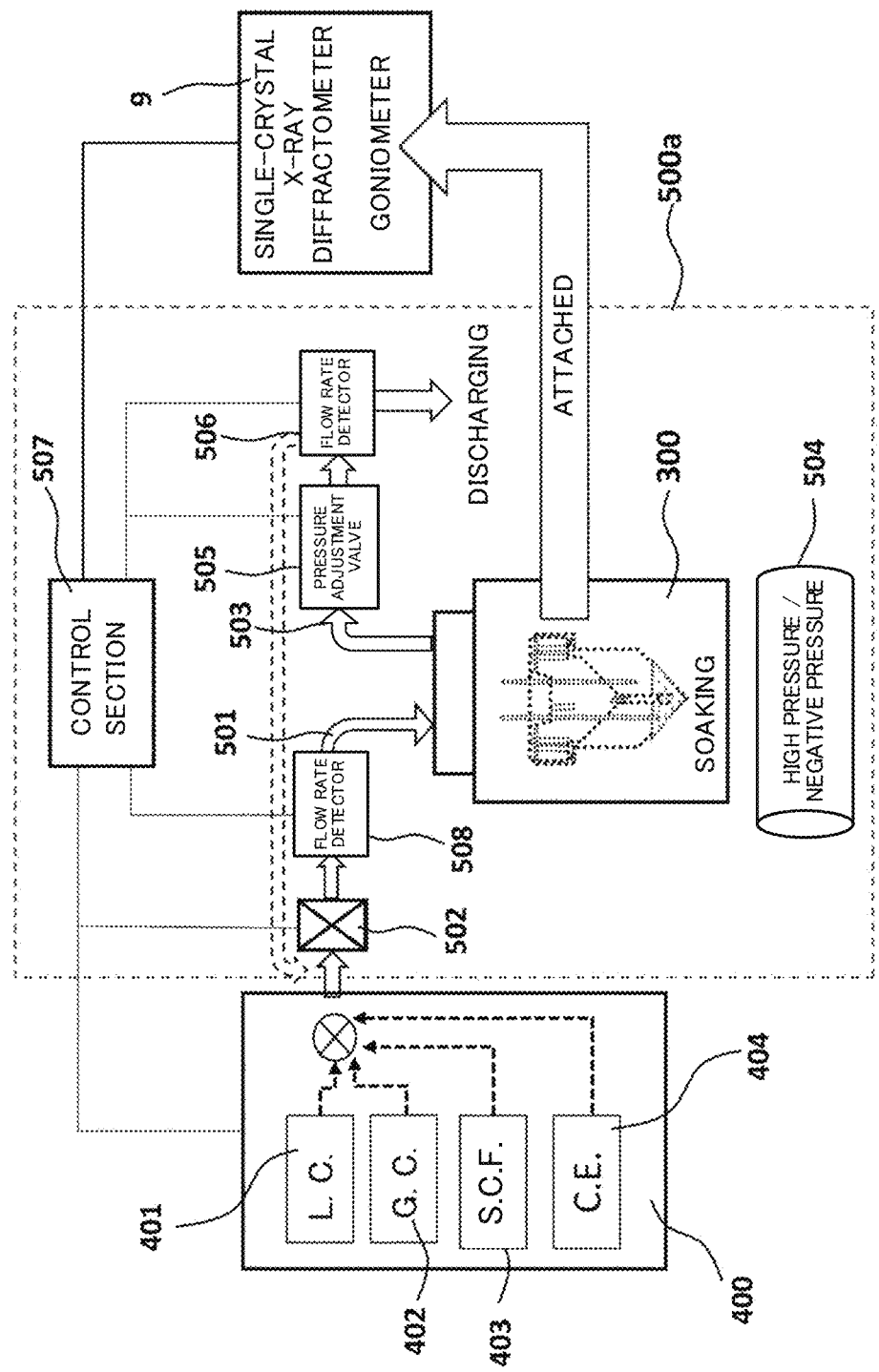
FIG. 13 is a diagram showing a configuration of another example of a soaking apparatus (soaking machine) constituting the single-crystal X-ray structure analysis system according to the present invention.

Further, the configuration of a soaking apparatus (soaking machine) 500a according to another example is shown in FIG. 13, and more specifically, in addition of the above-described configuration, the flow rate detector 508 for detecting an amount of a fluid flowing inside the introduction tube 501, together with the above-described on/off valve 502 is further provided in the middle of the introduction tube 501. It is made possible to more precisely grasp a flow rate of a very small amount of sample in a state of each type thereof, that is extracted and supplied with the pretreatment device 400, by comparing a flow rate of a fluid detected by the flow rate detector 506 on the introduction tube 503 side as described above, with a flow rate of a fluid detected by the flow rate detector 508 on the introduction tube 501 side; and thus the soaking apparatus 500a according to such another example specifically exhibits usefulness (advantage) in the case where a step at the time when the very small amount of sample is soaked in the crystal sponge 200 is determined as allowable or not, and so forth.

As is clear from those described above in detail, according to the single-crystal X-ray structure analysis system of the present invention, it is enabled to surely, quickly and easily perform single-crystal X-ray structure analysis with a very small and fragile crystalline sponge for a sample to be analyzed, that is supplied from a pretreatment device by which every kind of samples can be extracted, using a single-crystal X-ray structure analysis apparatus and a soaking apparatus (soaking machine) that constitute the system, together with a newly proposed sample holder (in addition to an applicator), without accompanying highly specialized knowledge and conventionally fine and precise operations; and it becomes possible to relatively easily confirm the molecular structure/aggregative structure (actual space) in a short period of time, in other words, provided is a user-friendly structure analysis system efficiently usable with high-yield and excellent versatility at sites and so forth of not only drug development and life science but also every kind of material research.

In addition, though various examples according to the present invention are described above, the present invention is not limited to the above-described examples and includes various modified examples. For example, the above-described examples describe the entire system in detail in order to facilitate understanding of the present invention, but are not necessarily limited to those having all the configurations that have been described. Further, a part of a configuration of one example may be replaced with a configuration of another example; further, a configuration of another example may be added to a configuration of one example; and with respect to a part of a configuration of each example, further performed may be addition/deletion/replacement of another configuration.

The present invention is widely applicable for a searching method of a material structure, an X-ray structure analysis system used for the same, and so forth.

In addition, the present international application claims priority under Japanese Patent Application No. 2018-218751, filed Nov. 22, 2018, and the entire content of Japanese Patent Application No. 2018-218751 is applied to the present international application.

EXPLANATION OF THE SYMBOLS

1 . . . Single-crystal X-ray structure analysis apparatus (whole), 9 . . . Single-crystal X-ray diffractometer, 11 . . . X-ray tube, 12 . . . Goniometer, 22 . . . X-ray detector, 102 . . . Measurement device, 103 . . . Input device, 104 . . . Image display device, 107 . . . CPU, 108 . . . RAM, 109 . . . ROM, 111 . . . Hard disk, 116 . . . Analysis application software, 117 . . . Measurement application software, 121 . . . Goniometer head, 250 . . . Sample holder, 200 . . . Crystalline sponge, 251 . . . Base part, 252 . . . Pin-shaped holding part, 253 . . . Fine hole, 254 . . . Sample introduction tube, 300 . . . Applicator, 301 . . . Storing space, 302 . . . Opening, 400 . . . Pretreatment device, 401 . . . LC, 402 . . . GC, 403 . . . SCF, 404 . . . CE, and 500 . . . Soaking apparatus (Soaking machine).

The invention claimed is:
1. A single-crystal X-ray structure analysis system that performs a structure analysis of a material, the single-crystal X-ray structure analysis system comprising:
a soaking apparatus, and
a single-crystal X-ray structure analysis apparatus, the single-crystal X-ray structure analysis apparatus comprising:
an X-ray source that generates X-rays;
a sample holder that holds a sample, the sample holder comprising a porous complex crystal capable of soaking the sample in a plurality of fine pores formed therein;
a goniometer that rotationally moves, the sample holder being attached to the goniometer;
an X-ray irradiation section that irradiates the X-rays from the X-ray source to the sample held by the sample holder attached to the goniometer;
an X-ray detection measurement section that detects and measures X-rays diffracted or scattered by the sample; and a structure analysis section that performs a structure analysis of the sample based on the diffracted or scattered X-rays detected by the X-ray detection measurement section, the soaking apparatus comprising:

a control section that soaks the sample in the porous complex crystal of the sample holder, and wherein the sample extracted by a pretreatment apparatus in soaked in the porous complex crystal of the sample holder by adjusting a pressure in a flow passage of an introduction tube and a discharging tube for the sample with the control section.

2. The single-crystal X-ray structure analysis system according to claim 1, further comprising:

a pretreatment apparatus, the pretreatment apparatus including at least one of liquid chromatography, gas chromatography, supercritical fluid chromatography and an electrophoresis apparatus, wherein the sample supplied by the pretreatment apparatus is selectively introduced into and is soaked in the porous complex crystal of the sample holder with the control section.

3. The single-crystal X-ray structure analysis system according to claim 2, wherein the sample extracted by the pretreatment apparatus is soaked in the porous complex crystal of the sample holder by adjusting a flow rate of the flow passage with the control section.

4. A single-crystal X-ray structure analysis system that performs a structure analysis of a material, the single-crystal X-ray structure analysis system comprising:

a soaking apparatus, and a single-crystal X-ray structure analysis apparatus, the single-crystal X-ray structure analysis apparatus comprising:

an X-ray source that generates X-rays;

a sample holder that holds a sample, the sample holder comprising a porous complex crystal capable of soaking the sample in a plurality of fine pores formed therein;

a goniometer that rotationally moves, the sample holder being attached to the goniometer;

an X-ray irradiation section that irradiates the X-rays from the X-ray source to the sample held by the sample holder attached to the goniometer;

an X-ray detection measurement section that detects and measures X-rays diffracted or scattered by the sample; and a structure analysis section that performs a structure analysis of the sample based on the diffracted or scattered X-rays detected by the X-ray detection measurement section, the soaking apparatus comprising:

a flow rate detector that detects a flow rate or a flow speed of a fluid including the sample; and a control section that soaks the sample in the porous complex crystal of the sample holder by control based on the detected flow rate or flow speed.

5. The single-crystal X-ray structure analysis system according to claim 4, further comprising:

a pretreatment apparatus, the pretreatment apparatus including at least one of liquid chromatography, gas chromatography, supercritical fluid chromatography and an electrophoresis apparatus, wherein the sample supplied by the pretreatment apparatus is selectively introduced into and is soaked in the porous complex crystal of the sample holder with the control section.

* * * * *